(12) United States Patent
Ura et al.

(10) Patent No.: US 11,162,386 B2
(45) Date of Patent: Nov. 2, 2021

(54) TURBOCHARGER

(71) Applicants: TOYOTA JIDOSHA KABUSHIKI KAISHA, Aichi-ken (JP); KABUSHIKI KAISHA TOYOTA JIDOSHOKKI, Aichi-ken (JP); TAIHO KOGYO CO., LTD., Aichi-ken (JP)

(72) Inventors: Haruto Ura, Nagakute (JP); Daisuke Terui, Kariya (JP); Keiichi Ohta, Okazaki (JP); Tsuyoshi Uesugi, Kariya (JP)

(73) Assignees: TOYOTA JIDOSHA KABUSHIKI KAISHA, Aichi-Ken (JP); TAIHO KOGYO CO., LTD., Aichi-Ken (JP)

( * ) Notice: Subject to any disclaimer, the term of this patent is extended or adjusted under 35 U.S.C. 154(b) by 77 days.

(21) Appl. No.: 16/430,425

(22) Filed: Jun. 4, 2019

(65) Prior Publication Data

US 2019/0390713 A1   Dec. 26, 2019

(30) Foreign Application Priority Data

Jun. 20, 2018   (JP) .............................. JP2018-117345

(51) Int. Cl.
*F01D 25/16*   (2006.01)
*F01D 25/18*   (2006.01)
*F16C 33/10*   (2006.01)

(52) U.S. Cl.
CPC ............. *F01D 25/16* (2013.01); *F01D 25/18* (2013.01); *F16C 33/1045* (2013.01);
(Continued)

(58) Field of Classification Search
CPC ...... F01D 25/16; F01D 25/18; F16C 33/1045; F16C 2360/24; F05D 2220/40; F05D 2240/50; F04D 29/046; F04D 29/047; F04D 29/0473; F04D 29/051; F04D 29/0513; F04D 29/056; F04D 29/057
See application file for complete search history.

(56) References Cited

U.S. PATENT DOCUMENTS 9,581,043 B2 *  2/2017  Uneura ............... F04D 29/0413
9,790,956 B2 * 10/2017  Takama ................. F02B 39/14
(Continued)

FOREIGN PATENT DOCUMENTS

JP   06066150 A  *  3/1994  .......... F16C 33/1045
JP   2015-86705 A    5/2015

OTHER PUBLICATIONS

ProQuest Machine Translation of JP 06066150 A (Year: 1994).*

*Primary Examiner* — Justin D Seabe
*Assistant Examiner* — Ryan C Clark
(74) *Attorney, Agent, or Firm* — Hauptman Ham, LLP

(57) ABSTRACT

A turbocharger includes: a shaft connecting a compressor wheel and a turbine wheel; a thrust collar rotating together with the shaft; a thrust bearing holding the thrust collar for rotation; and a bearing housing holding the thrust bearing, wherein the bearing housing includes: an oil supply passage for supplying oil for lubrication to the thrust bearing; an oil discharge passage from which the oil supplied to the thrust bearing is discharged; a wall portion facing the thrust collar; and a groove portion formed in the wall portion and extending from the thrust collar toward a discharge port of the oil discharge passage.

9 Claims, 10 Drawing Sheets

(52) U.S. Cl.
CPC ...... *F05D 2220/40* (2013.01); *F05D 2240/50* (2013.01); *F16C 2360/24* (2013.01)

(56) References Cited

U.S. PATENT DOCUMENTS

| | | | |
|---|---|---|---|
| 10,113,587 B1* | 10/2018 | Nicodemus | F16C 33/1065 |
| 2017/0328273 A1* | 11/2017 | Hettinger | F16C 35/042 |
| 2018/0195521 A1* | 7/2018 | Day | F02C 7/06 |

* cited by examiner

TURBOCHARGER

CROSS-REFERENCE TO RELATED APPLICATION

This application is based upon and claims the benefit of priority of the prior Japanese Patent Application No. 2018-117345, filed on Jun. 20, 2018, the entire contents of which are incorporated herein by reference.

TECHNICAL FIELD

The present disclosure relates to a turbocharger.

BACKGROUND

A bearing housing of a turbocharger is formed with an oil supply passage for supplying oil for lubricating a thrust bearing and with an oil discharge passage for discharging the oil (see, for example, Japanese Unexamined Patent Application Publication No. 2015-086705).

A compressor wheel of such a turbocharger is arranged within an intake passage of an internal combustion engine. The inner pressure of the intake passage may become negative depending on an operating state of the internal combustion engine. In such a case, the oil might be sucked from the oil discharge passage toward the intake passage, which might degrade oil discharge performance from the oil discharge passage.

SUMMARY

It is therefore an object of the present disclosure to provide a turbocharger that improves oil discharge performance from an oil discharge passage formed in a bearing housing.

It is an object of the present disclosure to provide a turbocharger including: a shaft connecting a compressor wheel and a turbine wheel; a thrust collar rotating together with the shaft; a thrust bearing holding the thrust collar for rotation; and a bearing housing holding the thrust bearing, wherein the bearing housing includes: an oil supply passage for supplying oil for lubrication to the thrust bearing; an oil discharge passage from which the oil supplied to the thrust bearing is discharged; a wall portion facing the thrust collar; and a groove portion formed in the wall portion and extending from the thrust collar toward a discharge port of the oil discharge passage.

Wind generated by the rotation of the thrust collar flows from the thrust collar toward the discharge port along the groove portion formed in the wall portion of the thrust collar. At least a part of the oil supplied to the thrust bearing flows into this groove. The oil flowing into the groove portion is scattered toward the discharge port by the wind pressure generated in response to the rotation of the thrust collar. This improves the oil discharge performance from the oil discharge passage formed in the bearing housing.

The groove portion may extend in a direction of a tangent line of a circle about a rotation axis of the thrust collar.

The thrust bearing may include a facing portion facing the thrust collar in a direction of a rotation axis of the thrust collar, the facing portion may include first and second end portions, and may extend from the first end portion to the second end portion in a form of a circular arc shape in a rotating direction of the thrust collar, and the second end portion may include an edge portion whose normal line passes through the discharge port.

The facing portion may include: an inclined portion whose thickness gradually increases to approach the thrust collar in the rotating direction of the thrust collar; and a flat portion adjacent to the inclined portion in the rotating direction, a thickness of the flat portion being equal to a maximum value of a thickness of the inclined portion, the thickness of the flat portion being constant in the rotating direction of the thrust collar, a clearance between the flat portion and the thrust collar in the direction of the rotation axis of the thrust collar may be smaller than a clearance between the inclined portion and the thrust collar in the direction of the rotation axis of the thrust collar, and the edge portion may be formed in the flat portion.

The facing portion may be formed with an outflow hole for flowing out the oil toward the thrust collar, a plurality of the inclined portions and a plurality of the flat portions may be alternately provided in the rotating direction of the thrust collar, and the outflow hole may be formed in at least one of the inclined portions excluding the inclined portion adjacent to the flat portion including the edge portion, in an opposite direction of the rotating direction of the thrust collar.

DETAILED DESCRIPTION

Figure 1:
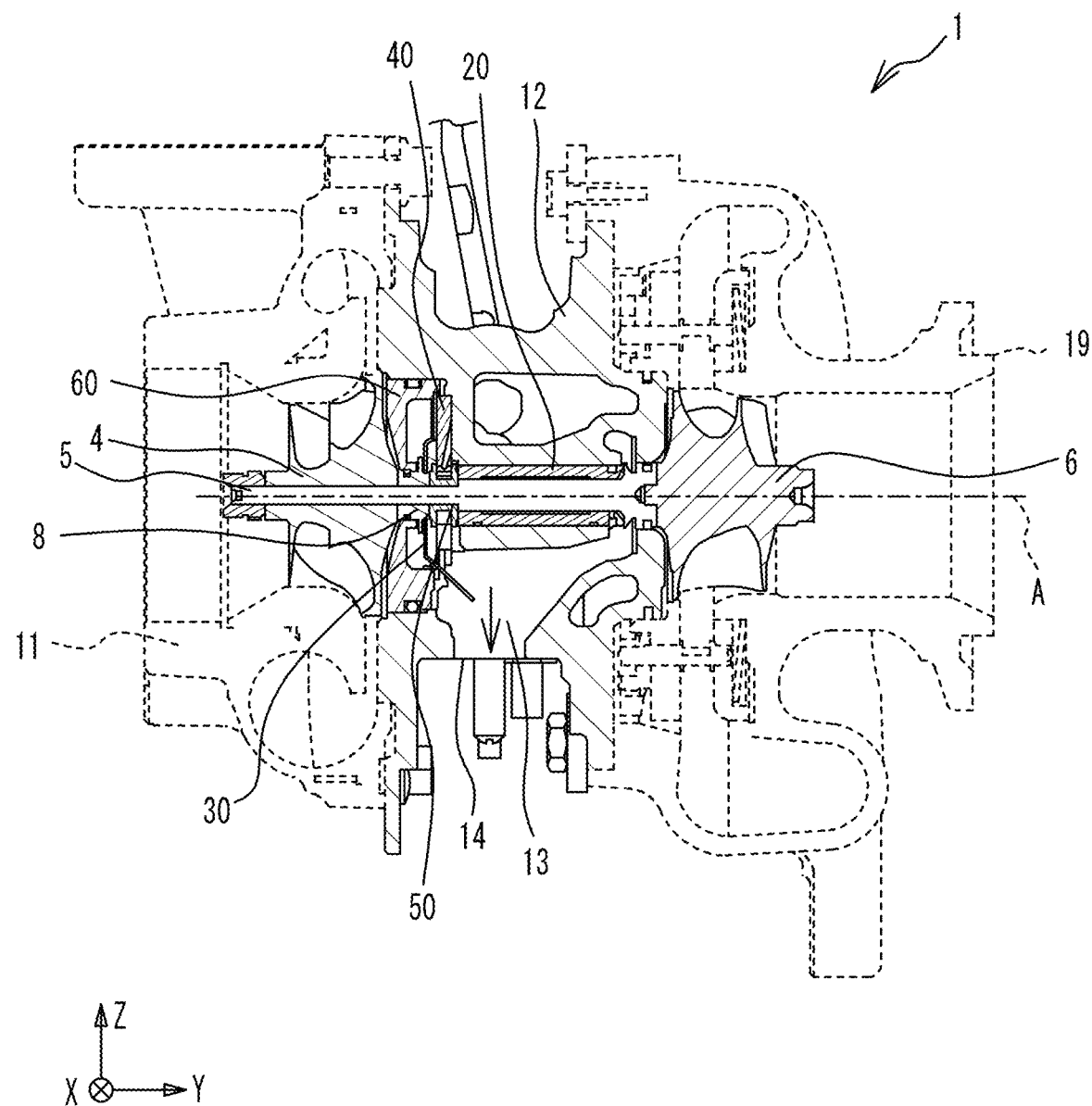
FIG. 1 is a sectional view of a turbocharger according to a present embodiment.
Figure 2:
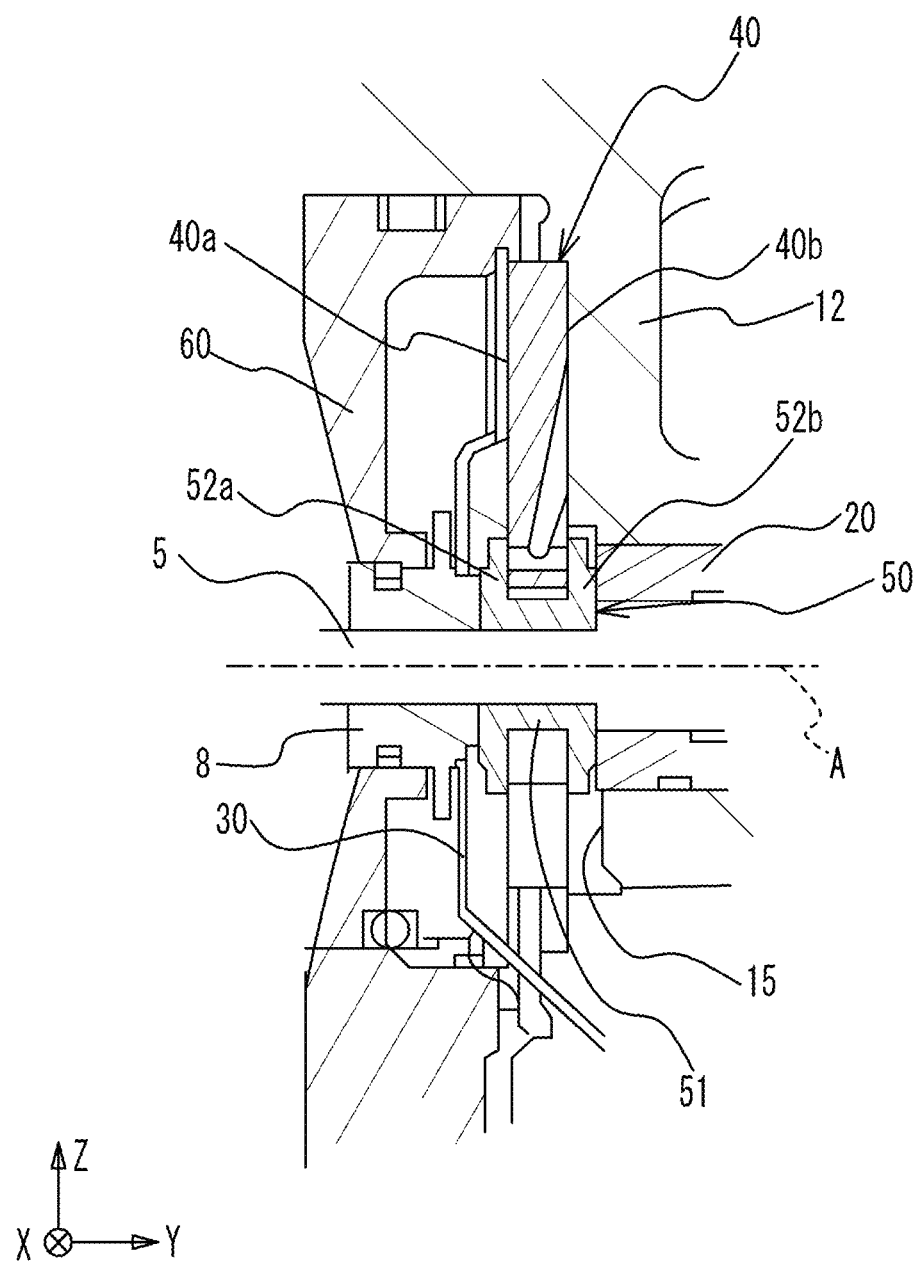
FIG. 2 is a partially enlarged view of FIG. 1.
Figure 3:
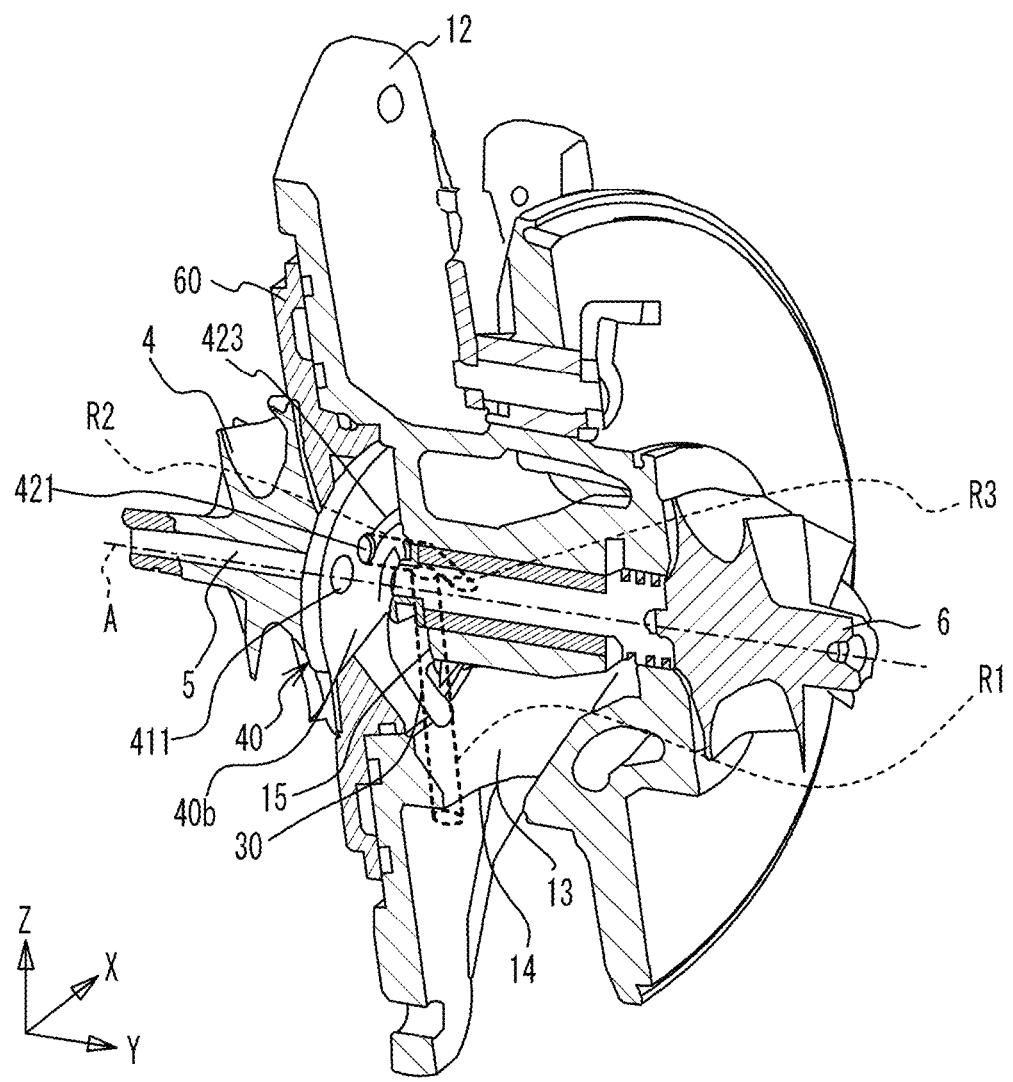
FIG. 3 is a partially sectional view of the turbocharger.
Figure 4:
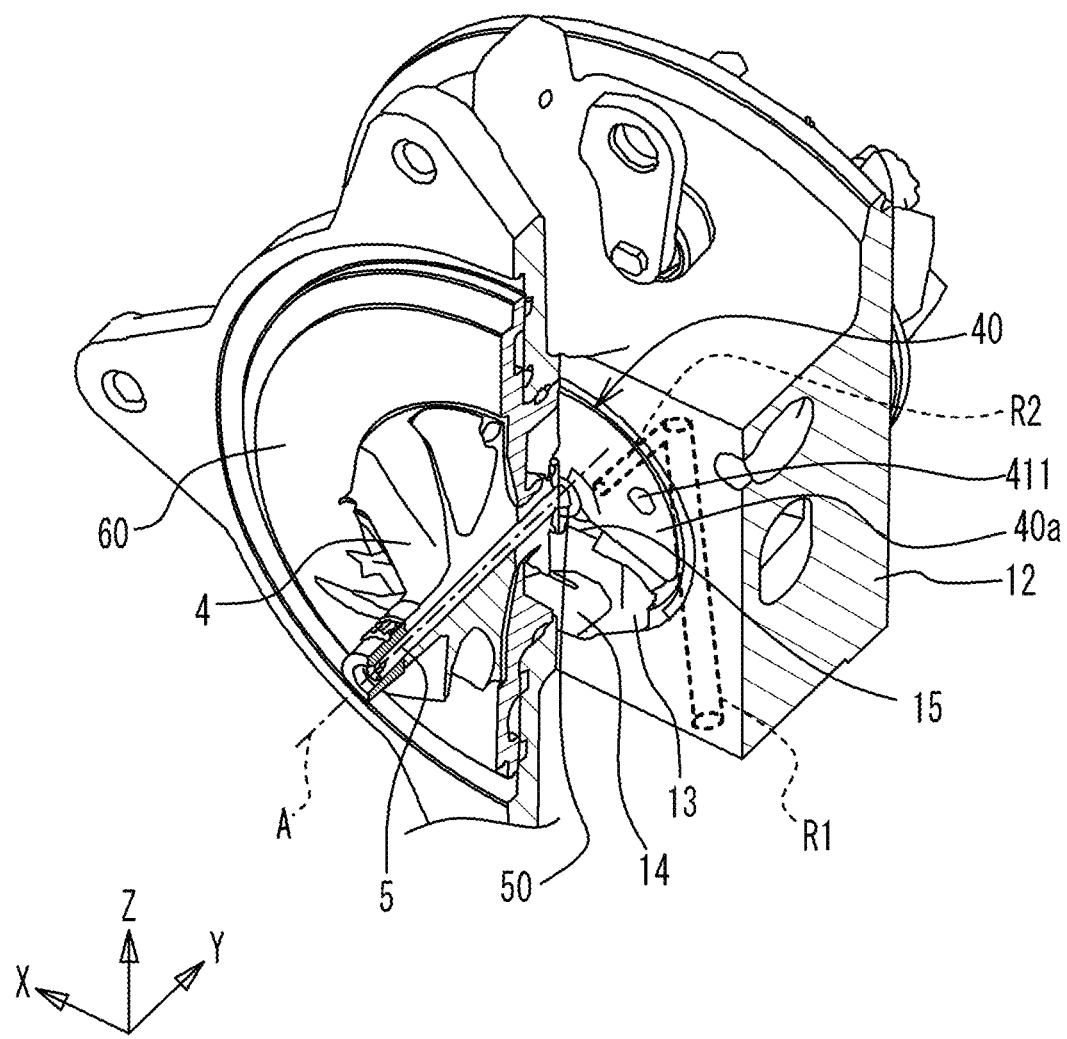
FIG. 4 is a partially sectional view of the turbocharger.
Figure 5:
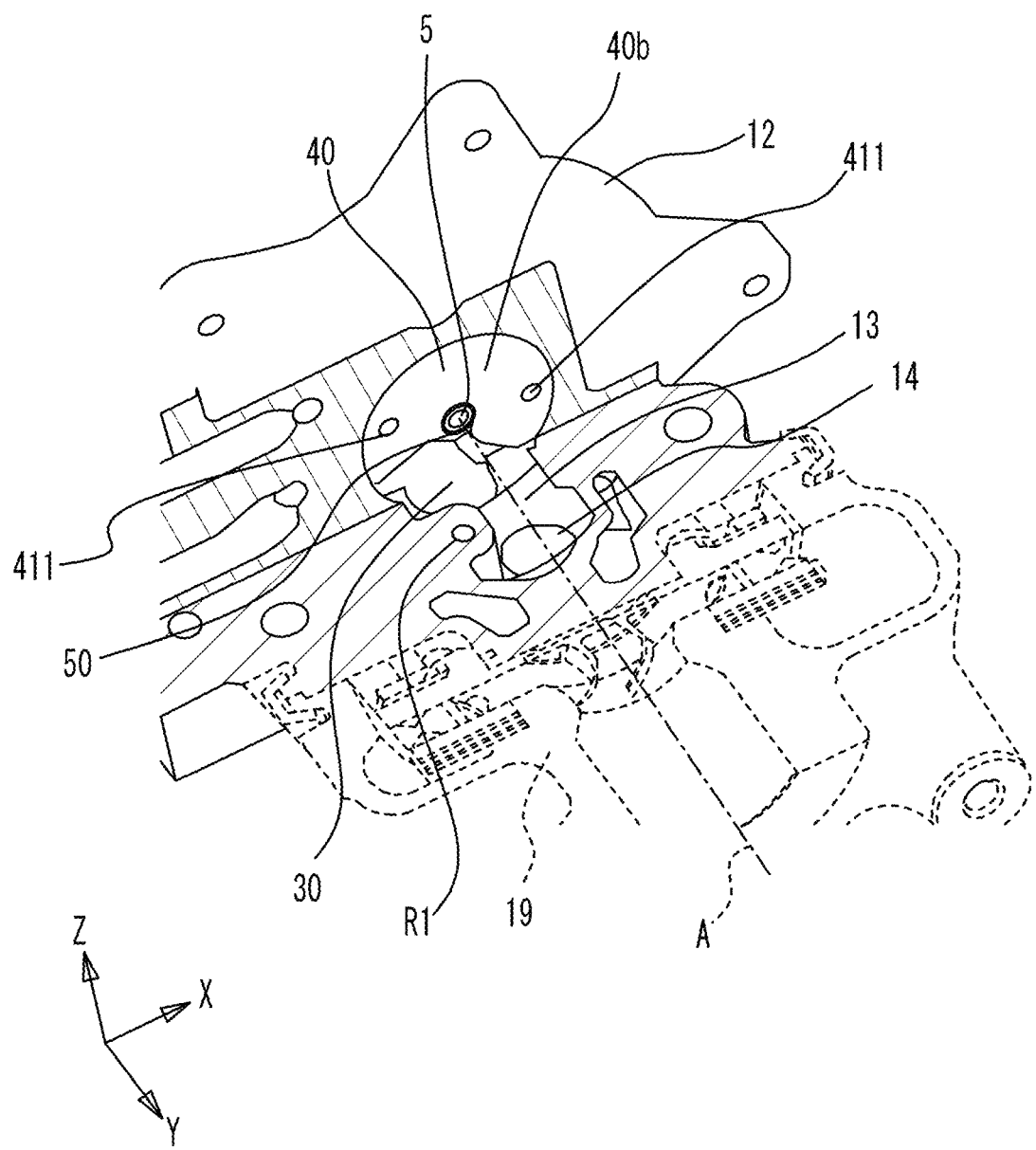
FIG. 5 is a partially sectional view of the turbocharger.

FIG. 1 is a sectional view of a turbocharger 1 according to a present embodiment. FIG. 2 is a partially enlarged view of FIG. 1. FIGS. 3 to 6 are partially sectional views of the turbocharger 1. FIGS. 1 to 6 illustrate a rotation axis A of a shaft 5 and X, Y, and Z directions orthogonal to one another. The Y direction is identical to the direction of the rotation axis A. The Z direction is identical to the upward vertical direction. A compressor housing 11 and a turbine housing 19 are illustrated by broken lines in FIG. 1 and omitted in FIGS. 3, 4, and 6. In FIG. 5, the compressor housing 11 is omitted, and only the turbine housing 19 is illustrated by broken lines. Although the turbocharger 1 according to the present embodiment is adapted to an engine used as a drive source for running a vehicle, it is not limited thereto, and it may be used for another engine.

As illustrated in FIG. 1, the turbocharger 1 includes a compressor wheel 4, the shaft 5, a turbine wheel 6, a seal ring collar 8, the compressor housing 11, a bearing housing 12, the turbine housing 19, a radial bearing 20, a deflector 30, a thrust bearing 40, a thrust collar 50, and a seal retainer 60. The compressor wheel 4 is fixed to an end portion in the −Y direction of the shaft 5. The turbine wheel 6 is fixed to an end portion in the +Y direction of the shaft 5. The shaft 5 connects the compressor wheel 4 and the turbine wheel 6. The compressor housing 11 is fixed to an end portion in the −Y direction of the bearing housing 12. The turbine housing 19 is fixed to an end portion in the +Y direction of the bearing housing 12. The bearing housing 12 is provided with an oil passage through which lubricating oil flows, as will be described later in detail.

The compressor housing 11, housing the compressor wheel 4 for rotation, defines a part of an intake passage that supplies intake air to the engine. The bearing housing 12 houses the shaft 5 for rotation via the radial bearing 20 and the thrust bearing 40. The turbine housing 19, housing the turbine wheel 6 for rotation, defines a part of an exhaust passage through which exhaust gas is discharged from the engine. In the turbocharger 1, when the turbine wheel 6 disposed in the exhaust passage of the engine is rotated by the exhaust gas energy of the engine, the compressor wheel 4 disposed in the partway of the intake passage of the engine is rotated via the shaft 5, and then air in the intake passage is pressurized to have positive pressure by the centrifugal compression action of the compressor wheel 4, which supercharges the engine.

The radial bearing 20 and the thrust bearing 40 are force fed lubrication type in which oil is forcibly supplied from the outside, and are held by the bearing housing 12. As illustrated in FIG. 1, the radial bearing 20 is inserted between the bearing housing 12 and the shaft 5. The thrust bearing 40 is held between the seal retainer 60 and the bearing housing 12 as illustrated in FIG. 1. The thrust collar 50, disposed between the shaft 5 and the thrust bearing 40, is fixed to the shaft 5. The radial bearing 20, the thrust bearing 40, and the thrust collar 50 will be described later in detail.

The seal ring collar 8, disposed between the shaft 5 and the seal retainer 60, is fixed to the shaft 5. The seal retainer 60, holding the seal ring collar 8 for rotation, is provided between the compressor wheel 4 and the thrust bearing 40. The deflector 30 having a substantially disc shape is fixed to the seal retainer 60 on the thrust bearing 40 side.

The deflector 30 is formed to have a diameter sufficiently larger than that of the seal retainer 60. By covering the one side of the seal retainer 60 with the deflector 30, the oil after forcibly supplied flowing out from the thrust bearing 40 is prevented from leaking to the compressor wheel 4. As described above, the thrust collar 50 and the seal ring collar 8 are fixed to the shaft 5 so as to integrally rotate. In contrast, the thrust bearing 40, the deflector 30, and the seal retainer 60 are integrally fixed to the bearing housing 12 so as not to rotate.

Figure 6:
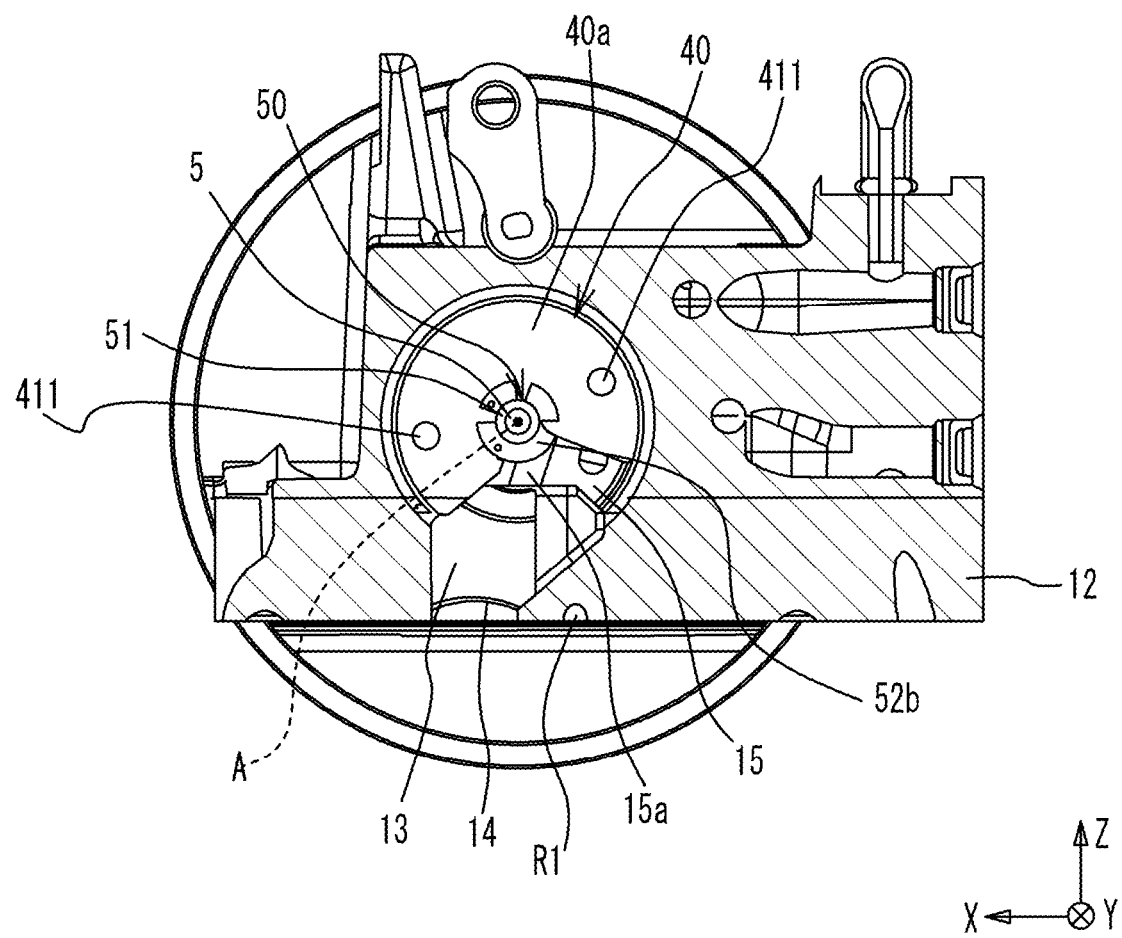
FIG. 6 is a partially sectional view of the turbocharger.

As illustrated in FIG. 6, the thrust bearing 40 has a substantially disk shape in which its lower part is cut out, or a substantially fan shape about the rotation axis A, in other words, a horseshoe shape. As illustrated in FIG. 2, the thrust bearing 40 includes a surface 40a on the compressor wheel 4 side, and a surface 40b on the turbine wheel 6 side. The thrust bearing 40 is formed with two bolt holes 411 penetrating through the thrust bearing 40 in its thickness direction and opening to the surfaces 40a and 40b. A bolt, fixing the deflector 30, the thrust bearing 40, and the seal retainer 60 to the bearing housing 12, penetrates through the bolt hole 411. As illustrated in FIG. 3, a supply portion 421, a guide portion 423, and the like are formed on the surface 40b of the thrust bearing 40. In FIG. 3, the cross section of the thrust bearing 40 is not illustrated.

In FIG. 3, oil supply passages R1, R2, and R3 formed in the bearing housing 12 are illustrated by broken lines. The oil supply passages R1, R2 and R3 are formed on a side opposite to a side of the bearing housing 12 illustrated in FIG. 3. In FIG. 4, the oil supply passages R1 and R2 are illustrated by broken lines. In FIGS. 5 and 6, a part of the oil supply passage R1 is illustrated. The oil supply passage R1 extends substantially in the +Z direction from the lower side of the bearing housing 12. The lubricating oil is stored in an oil pan disposed in the lower part of the engine, and the oil is supplied to the oil supply passage R1 by an oil pump. The oil supply passage R2 extends from the oil supply passage R1 in a direction substantially parallel to the Y direction and communicates with the supply portion 421 formed on the surface 40b of the thrust bearing 40. In such a way, the oil is supplied to the thrust bearing 40 via the oil supply passages R1 and R2 formed in the bearing housing 12.

As will be described later in detail, the oil supplied to the thrust bearing 40 is supplied between the thrust bearing 40 and the thrust collar 50 to form an oil film, which lubricates the thrust bearing 40 and the thrust collar 50. Further, the oil supply passage R3 extends from the oil supply passage R1 toward the radial bearing 20, and communicates with a space housing the shaft 5 and the radial bearing 20. The oil is supplied to the radial bearing 20 via the oil supply passages R1 and R3. The oil supplied to the radial bearing 20 is supplied between an inner circumferential surface of the radial bearing 20 and an outer circumferential surface of the shaft 5 via a passage formed in the radial bearing 20 to form an oil film, which lubricates the radial bearing 20 and the shaft 5. The bearing housing 12 is formed with flow passages through which cooling water flows.

As illustrated in FIG. 2, the thrust collar 50, having a substantially annular shape, includes a cylindrical portion 51 and flange portions 52a and 52b. Since the cylindrical portion 51 is fitted onto the shaft 5, the thrust collar 50 rotates together with the shaft 5 about the rotation axis A. The flange portion 52a, having a diameter larger than that of the cylindrical portion 51, is formed at one end of the cylindrical portion 51 on the seal ring collar 8 side in the direction of the rotation axis A. The flange portion 52b, having a diameter larger than that of the cylindrical portion 51, is formed at the other end of the cylindrical portion 51 on the side of the radial bearing 20 in the axial direction of the cylindrical portion 51. The flange portions 52a and 52b have, but not limited to, substantially the same diameter. The flange portions 52a and 52b face the surfaces 40a and 40b of the thrust bearing 40, respectively.

The bearing housing 12 is formed with an oil discharge passage 13, having a funnel shape, on the −Z direction side from the shaft 5, that is, on the vertically lower side. The oil used for lubricating the radial bearing 20 and the thrust bearing 40 is discharged from a discharge port 14 formed on the −Z direction side of the oil discharge passage 13. The discharge port 14 is connected with a pipe, and this pipe communicates with the oil pan disposed in the lower part of the engine. Accordingly, the oil discharged from the discharge port 14 is stored in the oil pan via the pipe.

Figure 7:
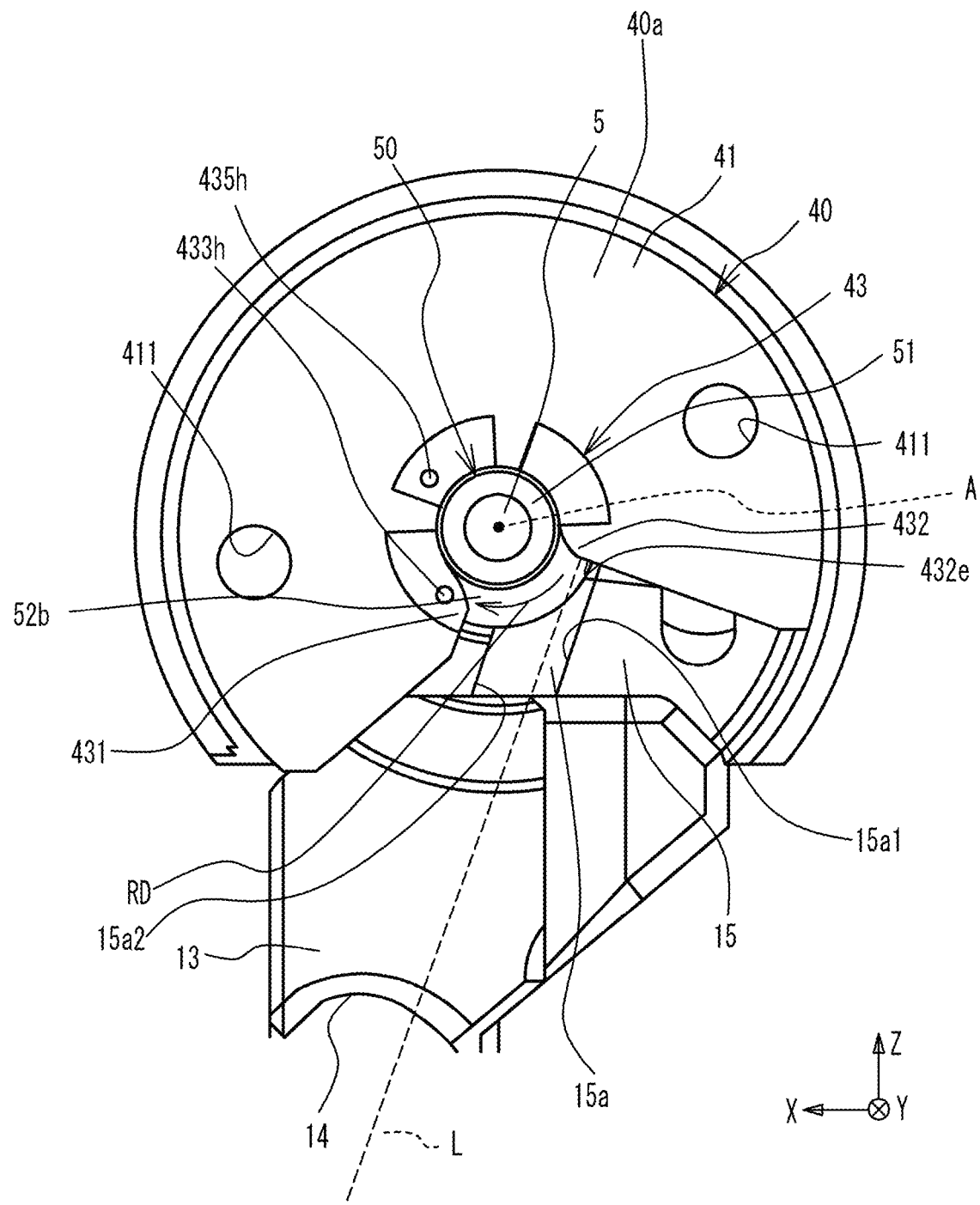
FIG. 7 is a partially enlarged view of FIG. 6.

FIG. 7 is a partially enlarged view of FIG. 6. The thrust bearing 40 includes a main body portion 41, a facing portion 43 positioned radially inward from the main body portion 41, and an inner circumferential portion 45 positioned radially inward from the facing portion 43. As described above, the main body portion 41 has a substantially fan shape about the rotation axis A. The facing portion 43 has a substantially circular arc shape about the rotation axis A. The inner circumferential portion 45 faces a part of the outer circumference of the cylindrical portion 51 of the thrust collar 50 and does not face the entire circumference of the cylindrical portion 51. In other words, the inner circumferential portion 45 of the thrust bearing 40 has a U-letter shape.

The facing portion 43 overlaps the flange portions 52a and 52b of the thrust collar 50 in the Y direction, that is, the direction of the rotation axis A. The main body portion 41 is formed with the above-described bolt holes 411. Further, FIG. 7 illustrates a rotating direction RD of the thrust collar 50. The thrust collar 50 rotates together with the shaft 5 in the rotating direction RD. The facing portion 43 includes end portions 431 and 432. The end portions 431 and 432 are examples of first and second end portions, respectively. The facing portion 43 extends from the end portion 431 to the end portion 432 in the form of a circular arc shape in the rotating direction RD. The end portion 431 is separated from the end portion 432 in an opposite direction of the rotating direction RD. The facing portion 43 is formed with outflow holes 433h and 435h described later in detail.

FIG. 7 illustrates a wall portion 15 of the bearing housing 12 facing the surface 40b of the thrust bearing 40 and the flange portion 52b of the thrust collar 50. The wall portion 15 is formed with a groove portion 15a extending from the thrust collar 50 toward the discharge port 14, when viewed in the Y direction, that is, the direction of the rotation axis A. A part of the groove portion 15a faces the flange portion 52b of the thrust collar 50. The groove portion 15a, recessed in the wall portion 15, extends linearly in a slightly inclined direction with respect to the −Z direction. The groove portion 15a has a depth that is constant in the direction in which the groove portion 15a extends. An extension line of the groove portion 15a extends to pass through the discharge port 14. The rotation of the thrust collar 50 generates wind around the thrust collar 50. Herein, since the groove portion 15a extends from the thrust collar 50 toward the discharge port 14, the wind generated in response to the rotation of the thrust collar 50 is guided toward the discharge port 14 by the groove portion 15a.

Herein, the oil is supplied to the thrust bearing 40 and the radial bearing 20 as described above, and at least a part of the oil supplied thereto flows into the groove portion 15a. For example, the oil supplied between the thrust bearing 40 and the thrust collar 50 may flow over the flange portion 52b of the thrust collar 50 through between the flange portion 52b and the wall portion 15 into the groove portion 15a. Also, a part of the oil leaking from between the radial bearing 20 and the shaft 5 toward the wall portion 15 may flow into the groove portion 15a. The oil flowing into the groove portion 15a is scattered toward the discharge port 14 by the wind pressure generated in response to the rotation of the thrust collar 50 and is directed toward the discharge port 14 by the groove portion 15a, as described above. In this manner, the oil discharge performance from the oil discharge passage 13 is improved.

In addition, since the groove portion 15a extends in the direction of a tangent line of a circle about the rotation axis A, the wind generated in response to the rotation of the thrust collar 50 is efficiently guided toward the discharge port 14. Therefore, the amount of air flowing from the groove portion 15a to the discharge port 14 is ensured, and the oil discharge performance from the oil discharge passage 13 is improved.

Further, as illustrated in FIG. 7, the groove portion 15a includes an edge 15a1 on the −X direction side and an edge 15a2 on the +X direction side. The edge 15a1 is positioned radially outward from the flange portion 52b. As a result, the oil flowing to the radially outer side of the flange portion 52b by the rotation of the flange portion 52b also flows into the groove portion 15a, so that the amount of oil flowing into the groove portion 15a is ensured.

Further, as illustrated in FIG. 7, an edge portion 432e is formed on a part of the end portion 432 of the facing portion 43 of the thrust bearing 40. When viewed in the direction of the rotation axis A, a normal line L of the edge portion 432e passes through the discharge port 14. Therefore, at least a part of the oil supplied between the thrust bearing 40 and the thrust collar 50 flows to the edge portion 432e of the end portion 432 of the thrust bearing 40 in response to the rotation of the thrust collar 50. In accordance with the wind pressure generated in response to the rotation of the thrust collar 50, the oil is scattered from the edge portion 432e in the direction of the normal line L. As a result, the oil discharge performance from the oil discharge passage 13 is improved.

As described above, a part of the oil supplied to the thrust bearing 40 flows over the flange portion 52b of the thrust collar 50 into the groove portion 15a, and the other part of the oil flows between the thrust bearing 40 and the thrust collar 50 to the edge portion 432e. In this manner, the oil discharged from the thrust bearing 40 through different passages is scattered to the discharge port 14. It is therefore possible to immediately discharge as much oil as possible from the oil discharge passage 13.

As described above, since the oil is discharged immediately from the discharge port 14, the retention of the oil in the oil discharge passage 13 formed into a funnel shape is suppressed, and, for example, oil leaking from an unintended part of the bearing housing 12 is suppressed. As a result, an increase in oil consumption is suppressed, and occurrence of abnormal combustion in the engine due to oil sucked toward the intake passage and transmitted to the engine is suppressed, even in a negative pressure state within the intake passage. Further, since the oil is scattered to the discharge port 14 in response to the rotation of the thrust collar 50, the oil discharge performance from the oil discharge passage 13 is ensured without being greatly influenced by an attitude and a vibration of a vehicle equipped with the turbocharger 1.

A distance between the thrust collar 50 and the wall portion 15 in the direction of the rotational axis A is desirably set to such a degree that the oil flows therebetween and that the oil is influenced by the wind pressure generated in response to the rotation of the thrust collar 50. In a case of a long distance between the thrust collar 50 and the wall portion 15 in the direction of the rotation axis, the oil in the groove portion 15a might be hardly influenced by the wind pressure generated in response to the rotation of the thrust collar 50, and the oil might not be scattered to the discharge port 14.

The shape of the groove portion 15a is appropriately set in consideration of the amount of the oil flowing into the groove portion 15a, the amount of the air flowing into the groove portion 15a, the direction of the air flowing into the groove portion 15a, the position of the discharge port 14, and the like. For example, in a cross-sectional view perpendicular to the direction in which the groove portion extends, each of an angle between one of two side surfaces opposing each other and a bottom surface connecting the two side surfaces, and an angle between the other of the two side surfaces and the bottom surface may be a right angle or an angle exceeding 90 degrees. Additionally, the shape of the groove portion may have a U-letter shape or V-letter shape in cross section. A depth of the groove portion may be constant or may be changed in the direction in which the groove portion extends. For example, in the case where the groove portion and the discharge port are distant from each other in the direction of the rotation axis A, the groove portion may be gradually shallow or deep in the direction in which the groove portion extends so as to direct the bottom surface of the groove portion to the discharge port. In addition, the width of the groove portion, but not limited to, may be constant or may be narrow as it approaches the discharge port 14. Further, the shape of the groove portion is not always limited to a linear shape, and may be a curved shape. Also, the number of the groove portions is not limited to one.

It is preferable that the deflector 30 is provided at such a position as not to intersect the extension line of the groove portion 15*a* and the normal line L, in order not to interfere with the oil scattered from the groove portion 15*a* and the edge portion 432*e* toward the discharge port 14.

Figure 8A:
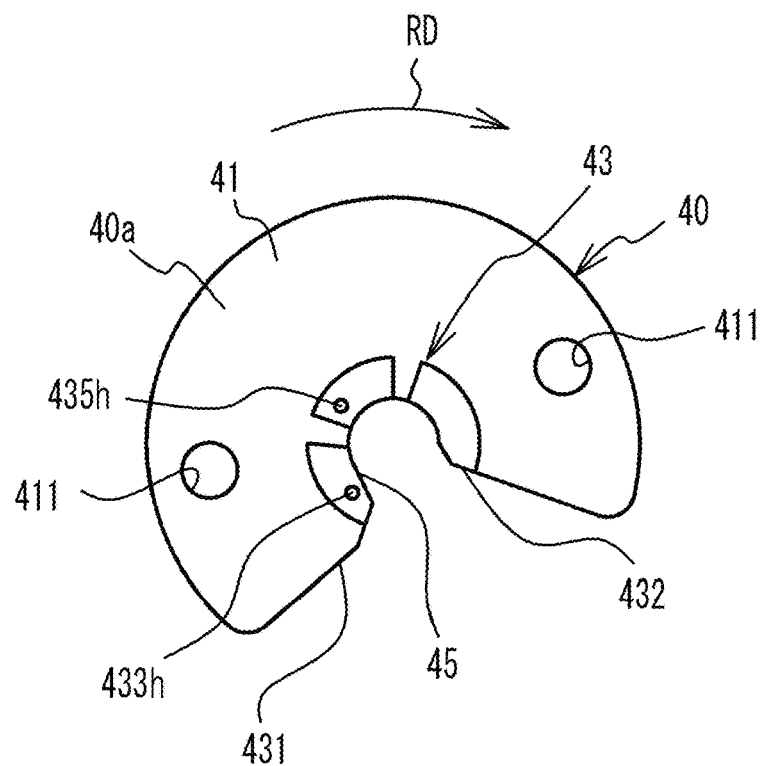
FIGS. 8A and 8B are explanatory views of a thrust bearing.
Figure 8B:
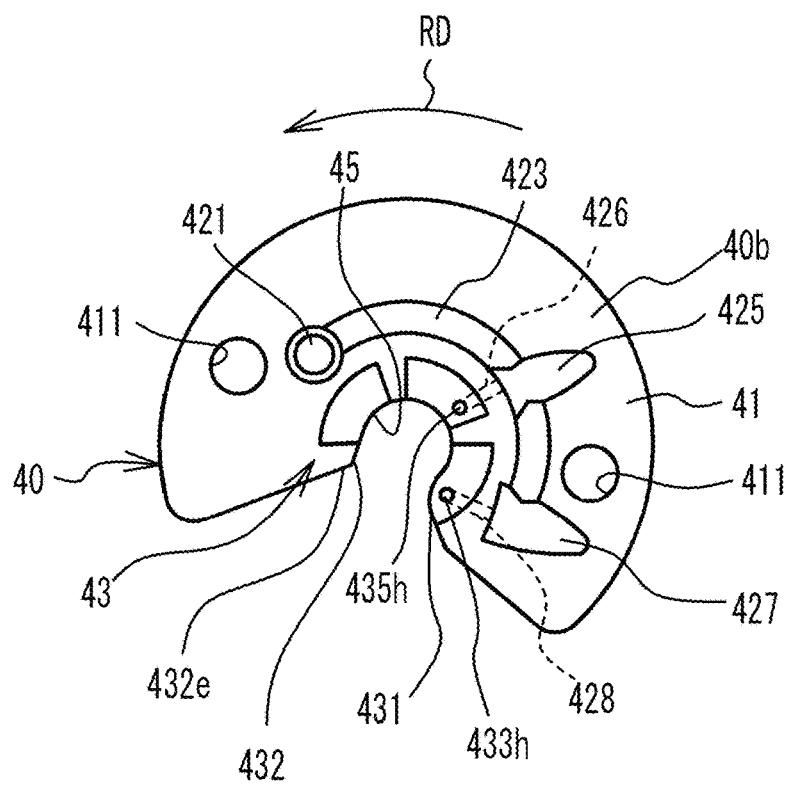

Next, the thrust bearing 40 will be described in detail. FIGS. 8A and 8B are explanatory views of the thrust bearing 40. FIG. 8A illustrates the thrust bearing 40 when viewed from the surface 40*a*. FIG. 8B illustrates the thrust bearing 40 when viewed from the surface 40*b*. The outflow holes 433*h* and 435*h* open to the respective surfaces 40*a* and 40*b* of the thrust bearing 40, that is, penetrate through the thrust bearing 40 in its thickness direction. The surface 40*b* of the thrust bearing 40 is formed with the supply portion 421, the guide portion 423, and intermediate portions 425 and 427. Each of the supply portion 421, the guide portion 423, and the intermediate portions 425 and 427 is formed into a concave shape with a bottom. The oil is supplied to the supply portion 421 via the supply passages R1 and R2 described above. The intermediate portion 425 is distant from the supply portion 421 in the opposite direction of the rotating direction RD. The intermediate portion 427 is distant from the intermediate portion 425 in the opposite direction of the rotating direction RD. The guide portion 423 is a groove extending in the form of an arc shape connecting the supply portion 421 and the intermediate portions 425 and 427.

The oil supplied to the supply portion 421 via the oil supply passages R1 and R2 is guided to the intermediate portions 425 and 427 via the guide portion 423. Communication passages 426 and 428 respectively communicating the intermediate portions 425 and 427 with the outflow holes 435*h* and 433*h* are formed within the thrust bearing 40. The communication passages 426 and 428 radially extend within the thrust bearing 40. Therefore, the oil guided to the intermediate portions 425 and 427 flows out from the outflow holes 433*h* and 435*h* via the communication passages 426 and 428, respectively. The oil flowing out from the outflow holes 433*h* and 435*h* is supplied between the thrust bearing 40 and the thrust collar 50.

Figure 9A:
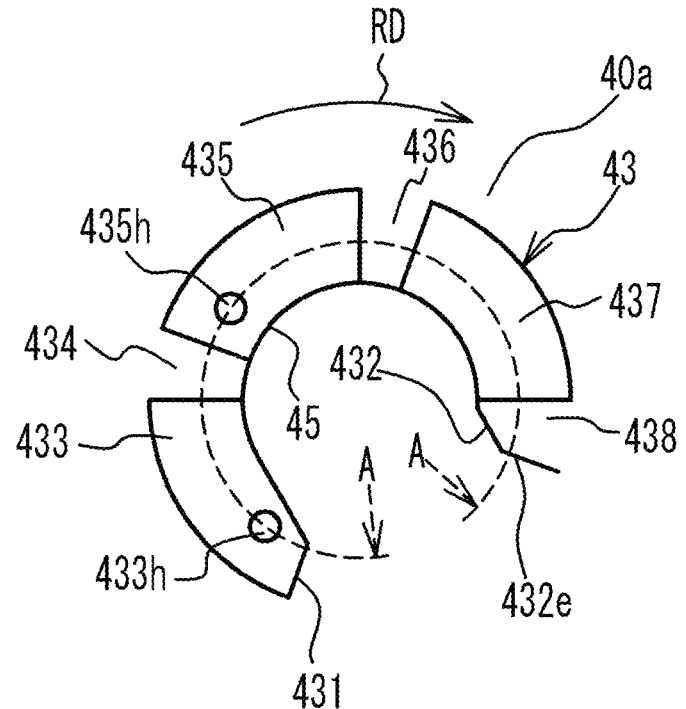
FIGS. 9A and 9B are enlarged views of a facing portion.
Figure 9B:
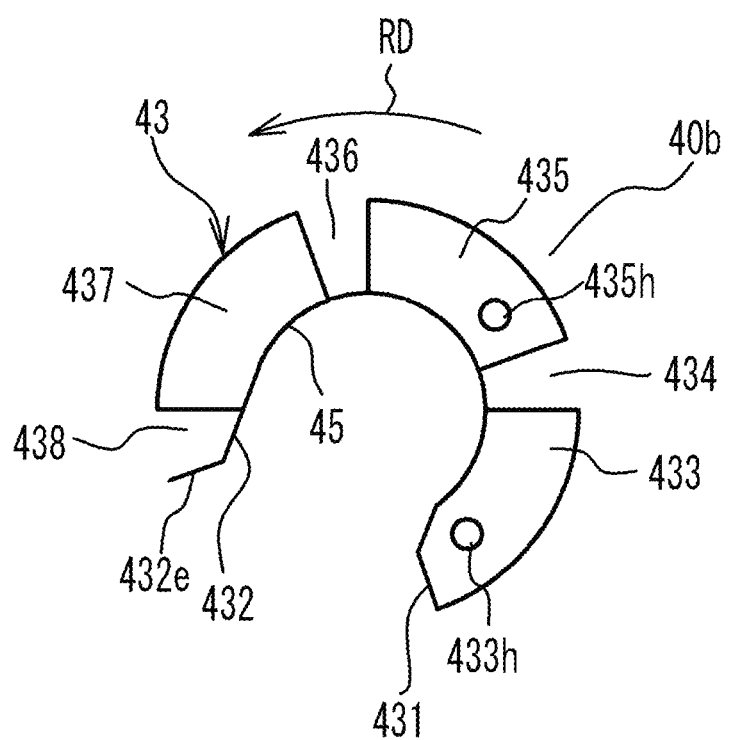

FIGS. 9A and 9B are enlarged views of the facing portion 43. FIG. 9A is an enlarged view of the facing portion 43 when viewed from the surface 40*a* of the thrust bearing 40. FIG. 9B is an enlarged view of the facing portion 43 when viewed from the surface 40*b* of the thrust bearing 40. The facing portion 43 is formed with the end portion 431, an inclined portion 433, a flat portion 434, an inclined portion 435, a flat portion 436, an inclined portion 437, and a flat portion 438 in order in the rotating direction RD from the end portion 431. That is, the inclined portions and the flat portions are alternately formed in the rotating direction RD. The outflow holes 433*h* and 435*h* are formed in the inclined portions 433 and 435, respectively. The outflow hole 433*h* is formed at a position closer to the end portion 431 than the flat portion 434. The outflow hole 435*h* is formed at a position closer to the flat portion 434 than the flat portion 436.

Figure 10:
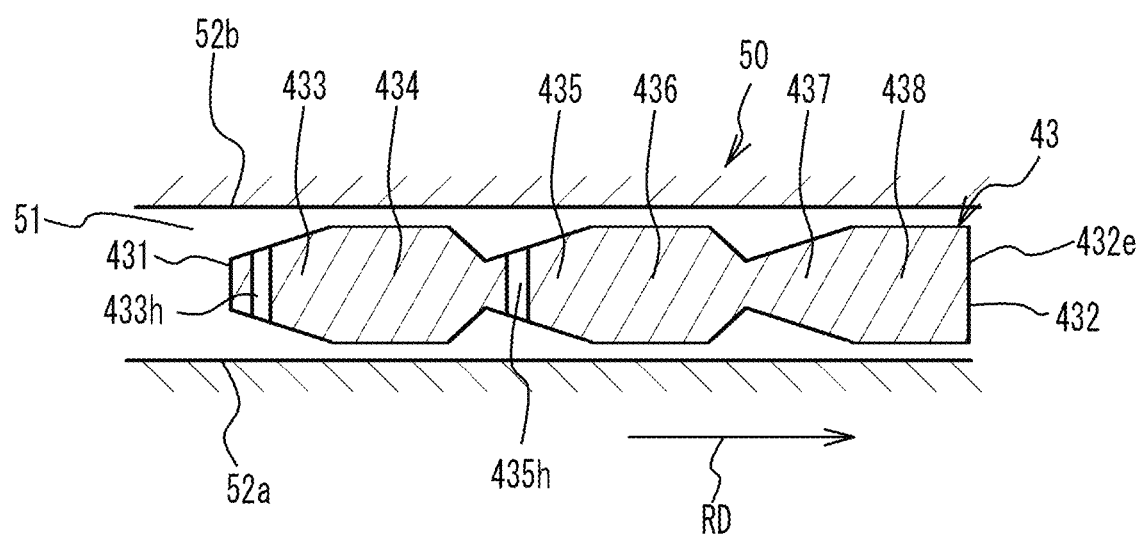
FIG. 10 is a developed view of a cross section taken along A-A line of FIG. 9A.

FIG. 10 is a developed view of a cross section taken along A-A line of FIG. 9A. FIG. 10 also illustrates the thrust collar 50 for easy understanding. Each thickness of the inclined portions 433, 435, and 437 gradually increases in the rotating direction RD. In contrast, each thickness of the flat portions 434, 436, and 438 is constant. Each thickness of the flat portions 434, 436, and 438 is the same as the maximum value of each thickness of the inclined portions 433, 435, and 437. Additionally, a portion, inclined away from the thrust collar 50 in the rotating direction RD and not indicated by numerical reference, is provided between the flat portion 434 and the inclined portion 435. The same applies to a portion between the flat portion 436 and the inclined portion 437.

The oil flowing out from the outflow holes 433*h* and 435*h* flows, on the surfaces 40*a* and 40*b* of the thrust bearing 40, from the respective inclined portions 433, 435, and 437 toward the respective flat portions 434, 436, and 438 adjacent thereto in the rotating direction RD, in response to the rotation of the thrust collar 50 in the rotating direction RD. Herein, a clearance between the thrust collar 50 and each of the flat portions 434, 436, and 438 is smaller than a clearance between the thrust collar 50 and each of the inclined portions 433, 435, and 437. Therefore, the oil film pressure increases in the clearance between the flange portion 52*a* of the thrust collar 50 and each of the flat portions 434, 436, and 438, and in the clearance between the flange portion 52*b* of the thrust collar 50 and each of the flat portions 434, 436, and 438. Thus, the contact of the thrust bearing 40 with the thrust collar 50 is suppressed. In addition, since the three flat portions 434, 436, and 438 are formed in the facing portion 43 in such a way, the thrust collar 50 is stably supported.

Herein, the end portion 432 provided with the edge portion 432*e* is formed in the flat portion 438. As described above, the oil pressure increases in the clearance between the flange portion 52*a* of the thrust collar 50 and the flat portion 438, and in the clearance between the flange portion 52*b* of the thrust collar 50 and the flat portion 438. Therefore, such high pressure oil is scattered from the edge portion 432*e* toward the discharge port 14. For this reason, the oil scattering distance is ensured, and the oil discharge performance is improved.

As illustrated in FIGS. 9A, 9B, and 10, the inclined portion 437, adjacent to the flat portion 438 provided with the edge portion 432*e*, is not provided with a hole, from which the oil flows out, such as the outflow holes 433*h* and 435*h*. In a case of providing an outflow hole in the inclined portion 437, the oil flowing out from the outflow hole provided in the inclined portion 437 might be immediately discharged from the flat portion 438 to the discharge port 14 via the edge portion 432*e*. Thus, the oil might not be efficiently used for lubrication between the thrust bearing 40 and the thrust collar 50. Since the inclined portion 437, adjacent to the flat portion 438 provided with the edge portion 432*e*, is not provided with the outflow hole in the present embodiment, the efficient use of the oil is ensured.

Although some embodiments of the present disclosure have been described in detail, the present disclosure is not limited to the specific embodiments but may be varied or changed within the scope of the present disclosure as claimed.

What is claimed is:

1. A turbocharger, comprising:
   a shaft connecting a compressor wheel and a turbine wheel;
   a thrust collar rotating together with the shaft;
   a thrust bearing holding the thrust collar for rotation; and
   a bearing housing holding the thrust bearing,
   wherein
   the bearing housing includes:
      an oil supply passage for supplying oil for lubrication to the thrust bearing;

an oil discharge passage from which the oil supplied to the thrust bearing is discharged;

a wall portion facing the thrust collar; and a groove portion formed in the wall portion and extending from the thrust collar toward a discharge port of the oil discharge passage, wherein the groove portion extends toward and reaches a lower end of the wall portion.

2. The turbocharger of claim 1, wherein the groove portion extends in a direction of a tangent line of a circle about a rotation axis of the thrust collar.

3. The turbocharger of claim 1, wherein the thrust bearing includes a facing portion facing the thrust collar in a direction of a rotation axis of the thrust collar, the facing portion includes first and second end portions, and extends from the first end portion to the second end portion in a form of a circular arc shape in a rotating direction of the thrust collar, and the second end portion includes an edge portion whose normal line passes through the discharge port.

4. The turbocharger of claim 3, wherein the facing portion includes:

an inclined portion whose thickness gradually increases to approach the thrust collar in the rotating direction of the thrust collar; and a flat portion adjacent to the inclined portion in the rotating direction, a thickness of the flat portion being equal to a maximum value of a thickness of the inclined portion, the thickness of the flat portion being constant in the rotating direction of the thrust collar, a clearance between the flat portion and the thrust collar in the direction of the rotation axis of the thrust collar is smaller than a clearance between the inclined portion and the thrust collar in the direction of the rotation axis of the thrust collar, and the edge portion is formed in the flat portion.

5. The turbocharger of claim 4, wherein the facing portion is formed with an outflow hole for flowing out the oil toward the thrust collar, a plurality of the inclined portions and a plurality of the flat portions are alternately provided in the rotating direction of the thrust collar, and the outflow hole is formed in at least one of the inclined portions excluding the inclined portion adjacent to the flat portion including the edge portion, in an opposite direction of the rotating direction of the thrust collar.

6. The turbocharger of claim 1, wherein the groove portion is formed in a surface of the wall portion, the surface perpendicular to a rotation axis of the thrust collar.

7. The turbocharger of claim 1, wherein, when viewed along a rotation axis of the thrust collar, a linear extension line of the groove portion extends through the discharge port.

8. The turbocharger of claim 1, further comprising:

a deflector fixed to the bearing housing and configured to prevent the oil from leaking to the compressor wheel, wherein the deflector is arranged at such a position as to not intersect a linear extension line of the groove portion, to avoid interfering with the oil scattered from the groove portion toward the discharge port.

9. A turbocharger, comprising:

a shaft connecting a compressor wheel and a turbine wheel;

a thrust collar rotating together with the shaft;

a thrust bearing holding the thrust collar for rotation; and a bearing housing holding the thrust bearing, wherein the bearing housing includes:

an oil supply passage for supplying oil for lubrication to the thrust bearing;

an oil discharge passage from which the oil supplied to the thrust bearing is discharged;

a wall portion facing the thrust collar; and a groove portion formed in the wall portion and extending from the thrust collar toward a discharge port of the oil discharge passage, the thrust bearing includes a facing portion facing the thrust collar in a direction of a rotation axis of the thrust collar, the facing portion includes first and second end portions, and extends from the first end portion to the second end portion in a form of a circular arc shape in a rotating direction of the thrust collar, the second end portion includes an edge portion whose normal line passes through the discharge port, the facing portion includes:

an inclined portion whose thickness gradually increases to approach the thrust collar in the rotating direction of the thrust collar; and a flat portion adjacent to the inclined portion in the rotating direction, a thickness of the flat portion being equal to a maximum value of a thickness of the inclined portion, the thickness of the flat portion being constant in the rotating direction of the thrust collar, a clearance between the flat portion and the thrust collar in the direction of the rotation axis of the thrust collar is smaller than a clearance between the inclined portion and the thrust collar in the direction of the rotation axis of the thrust collar, the edge portion is formed in the flat portion, the facing portion is formed with an outflow hole for flowing out the oil toward the thrust collar, a plurality of the inclined portions and a plurality of the flat portions are alternately provided in the rotating direction of the thrust collar, and the outflow hole is formed in at least one of the inclined portions excluding the inclined portion adjacent to the flat portion including the edge portion, in an opposite direction of the rotating direction of the thrust collar.

* * * * *

UNITED STATES PATENT AND TRADEMARK OFFICE
CERTIFICATE OF CORRECTION

PATENT NO. : 11,162,386 B2
APPLICATION NO. : 16/430425
DATED : November 2, 2021
INVENTOR(S) : Haruto Ura et al.

It is certified that error appears in the above-identified patent and that said Letters Patent is hereby corrected as shown below:

On the Title Page

Item (71), Line 1 to 6, change "TOYOTA JIDOSHA KABUSHIKI KAISHA, Aichi-ken (JP); KABUSHIKI KAISHA TOYOTA JIDOSHOKKI , Aichi-ken (JP); TAIHO KOGYO CO., LTD., Aichi-ken (JP)" to -- TOYOTA JIDOSHA KABUSHIKI KAISHA, Aichi-ken (JP); TAIHO KOGYO CO., LTD., Aichi-ken (JP) --

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*